(12) United States Patent
Shindo

(10) Patent No.: US 6,492,288 B2
(45) Date of Patent: *Dec. 10, 2002

(54) GLASS CERAMIC AND TEMPERATURE COMPENSATING MEMBER

(75) Inventor: Ayako Shindo, Sagamihara (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 134 days.

This patent is subject to a terminal disclaimer.

(21) Appl. No.: 09/725,043

(22) Filed: Nov. 29, 2000

(65) Prior Publication Data

US 2002/0058578 A1 May 16, 2002

(30) Foreign Application Priority Data

Sep. 28, 2000 (JP) ........................................ 2000-296684

(51) Int. Cl.$^7$ ........................... C03C 10/04; C03C 10/12
(52) U.S. Cl. .................................................. 501/4; 501/7
(58) Field of Search ........................................... 501/4, 7

(56) References Cited

U.S. PATENT DOCUMENTS

| | | |
|---|---|---|
| 4,209,229 A | 6/1980 | Rittler |
| 4,507,392 A | 3/1985 | Rittler |
| 5,694,503 A | 12/1997 | Fleming et al. |
| 5,721,802 A | 2/1998 | Francis et al. |
| 5,926,599 A | 7/1999 | Bookbinder et al. |
| 6,087,280 A | 7/2000 | Beall et al. |
| 6,187,700 B1 | 2/2001 | Merkel |
| 6,209,351 B1 | 4/2001 | Beall et al. |
| 6,362,118 B1 * | 3/2002 | Beall et al. ..................... 501/7 |
| 6,400,884 B1 * | 6/2002 | Matano et al. .............. 385/137 |

FOREIGN PATENT DOCUMENTS

| | | |
|---|---|---|
| EP | 0 812 810 A2 | 12/1997 |
| EP | 0 995 723 A1 | 4/2000 |
| JP | A 63-201034 | 8/1980 |
| JP | A 2-208256 | 8/1990 |
| JP | A 10-73740 | 3/1998 |
| JP | A 10-90555 | 4/1998 |
| JP | A 10-96827 | 4/1998 |
| JP | A 11-290029 | 10/1999 |
| JP | A 2000-503415 | 3/2000 |
| JP | A 2000-503967 | 4/2000 |
| JP | A 2000-266942 | 9/2000 |
| JP | A 2000-266943 | 9/2000 |
| JP | A 2000-313654 | 11/2000 |
| JP | A 2000-319616 | 11/2000 |
| JP | A 2000-321442 | 11/2000 |
| JP | A 2000-352633 | 12/2000 |
| JP | A 2001-172048 | 6/2001 |
| WO | WO 97/26572 | 7/1997 |
| WO | WO 97/28480 | 8/1997 |
| WO | WO 99/06859 | 2/1999 |
| WO | WO 99/64898 | 12/1999 |
| WO | WO 01/04671 A1 | 1/2001 |

* cited by examiner

Primary Examiner—Karl Group
(74) Attorney, Agent, or Firm—Oliff & Berridge, PLC

(57) ABSTRACT

A glass ceramic comprises a main crystal phase which comprises at least one selected from a group consisting of β-eucryptite (β-$Li_2O.Al_2O_3.2SiO_2$), β-eucryptite solid solution (β-$Li_2O.Al_2O_3.2SiO_2$ solid solution), β-quartz (β-$SiO_2$), and β-quartz solid solution (β-$SiO_2$ solid solution), wherein an average grain size of the main crystal phase is less than 5 μm, and a coefficient of thermal expansion thereof is $-30 \times 10^{-7}$ to $-90 \times 10^{-7}$/° C. in a temperature range of $-40°$ C. to $+160°$ C., and a hysteresis of the coefficient of thermal expansion is not more than 20 ppm.

7 Claims, 1 Drawing Sheet

GLASS CERAMIC AND TEMPERATURE COMPENSATING MEMBER

BACKGROUND OF THE INVENTION

1. Field of the Invention

The present invention relates to a glass ceramic and a temperature compensating member using the glass ceramic, which can be used in many fields, e.g., information communication field, energy related field, electronics field, and the like. In particular, in the optical communication field, they can be used as a part of a device including an optical fiber, e.g., an optical fiber grating, connector or the like, and have a negative coefficient of thermal expansion and can provide a temperature compensation to the device.

2. Description of the Related Art

Recently, an optical fiber is frequently used in the optical communication field and the like. The optical fiber related device is required not to be adversely affected by temperature, on the characteristic of the optical fiber itself.

For example, the connector for the optical fiber is used as an input/output terminal for an optical transmission device or an optical measurement apparatus, or a connector for connecting a plurality of optical cables to each other in an optical transmission path. Such a device having a purpose of fixing, connecting or protecting the optical fibers is required not to be adversely affected on the optical fibers, by the strain caused by expansion or shrinkage of the device according to a temperature change, for example, to have a structure of combination of materials having desired coefficients of thermal expansion, or the like.

Applications of fiber grating are being expanded in wavelength division multiplexing system, for example, as a device for performing dispersion compensation, wavelength stabilization for a semiconductor laser, or the like, which uses a narrow wavelength band selection property thereof. However, it is known that the fiber grating has a temperature dependency of the center wavelength of a reflected light because the effective refractive index of the core portion changes with temperature. Therefore, it is also required that the fiber grating reduces an adverse influence from temperature change as much as possible.

For various types of equipment, apparatus and the like, used not only in the optical fiber related field but also in the energy related field, the information related field, or the like, a material which can adjust the coefficient of thermal expansion of a device or a precision component included in the equipment, apparatus and the like, to an appropriate value, in order to prevent generation of strain or internal stress, caused by a temperature difference, and which is qualified for giving a good dimensional accuracy, a good dimensional stability, a high strength, a good thermal stability or the like, is required.

Conventionally, as materials suitable for various types of devices on the above-described point of temperature change, ceramics, glass ceramics, glass, metal and the like have been used because of having a high heat resistance, a small coefficient value of thermal expansion and the like.

However, these materials have a positive coefficient of thermal expansion, that is, a characteristics of expanding in volume as the temperature increases. Many of other materials used for the devices together with the materials having the positive coefficient have also a positive coefficient of thermal expansion. Therefore, these materials are not necessarily the optimum ones for preventing the adverse influence from the temperature change of the whole device. For this reason, a material having a negative coefficient of thermal expansion, to cancel the positive coefficient of thermal expansion, that is, characteristics of shrinking in volume as the temperature increases, is desired as a material which opposes temperature changes.

As a material having a negative coefficient of thermal expansion, inorganics, e.g., β-eucryptite crystal, $Li_2O$—$Al_2O_3$—$SiO_2$ system ceramics including the β-eucryptite crystal, $Li_2O$—$Al_2O_3$—$SiO_2$ system glass ceramics, $ZnO$—$Al_2O_3$—$SiO_2$ system glass ceramics, lead titanate, hafnium titanate, zirconium tungstate, tantalum tungstate, and the like are known.

U.S. Pat. No. 6,087,280 discloses athermal optical device and a method for producing the device. The device comprises a negative thermal expansion substrate and an optical fiber mounted on the substrate surface and having a grating. In the optical fiber reflective grating device, although the change of the grating center wavelength is approximately 1.9 nm when not attached to the substrate, it comes to be only 0.2 nm when attached to the substrate. The negative thermal expansion substrate comprises a glass-ceramic having β-eucryptite crystal, wherein the substrate has a coefficient of thermal expansion in the range from $-20 \times 10^{-7}/°C$. to $-100 \times 10^{-7}/°C$. in the temperature range of $-40°C$. to $85°C$. and the hysteresis of the coefficient of thermal expansion is restrained to not more than 20 ppm.

However, the glass-ceramic used in the technique includes many microcracks because of its negative coefficient of thermal expansion and the crystal size to form the microcracks has a diameter larger than 5 μm. There are problems that such a material cannot obtain an enough mechanical strength and impregnates chemical agents or the like easily during a treatment. Impregnation of a chemical agent having a positive coefficient of thermal expansion cancels the inherent negative thermal expansion property of the ceramic. As a result, it is not possible to obtain a desired coefficient of thermal expansion at all.

The crystal phase thereof includes $Al_2TiO_5$. It is generally known that because $Al_2TiO_5$ has a large anisotropic expansion, the thermal expansion is highly anisotropic for a sintered body and therefore the results of repeated measurements do not coincide with one another in general, and that it is difficult to make the strength large because of the existence of microcracks. There is also another problem that such a material makes the production costs large because a heat-treatment for crystallizing the glass at a temperature of not less than 1,300° C. for 3 or more hours is required, in order to obtain an enough negative coefficient of thermal expansion.

U.S. Pat. No. 4,209,229 discloses a glass ceramic comprising a main crystal phase of β-eucryptite or β-quartz solid solution, and the reference says that the material is particularly useful for a protective outer layer for the molten silica or useful for a cladding layer for another optical fiber waveguide member.

However, because the glass ceramic includes much $TiO_2$ to make the crystals fine and therefore lacks for stability of glass, only a thin material thereof can be obtained. Further, there are also problems that a very high temperature, preferably, 1,000° C. to 1,300° C., is required for crystallizing the glass and that the negative coefficient of thermal expansion of the glass ceramic is not enough, i.e., about $-2 \times 10^{-7}/°C$.

U.S. Pat. No. 4,507,392 discloses a transparent glass ceramic material containing β-quartz solid solution as the predominant crystal phase especially suitable for application as a decorative glaze to glass, glass ceramic, and ceramic bodies.

However, because the glass ceramic includes a large quantity of nucleation agents, it is difficult to obtain a material having a large negative coefficient of thermal expansion. The minimum negative coefficient of thermal expansion of the material obtained by the technique of the reference is only $-29.4 \times 10^{-7}/°$ C. which is not enough.

Japanese Patent Application Publication (Laid-open) No. Tokukai-sho 63-201034 discloses a method for producing a crystallized glass (glass ceramic) having a negative coefficient of thermal expansion. The method comprises the steps of: mixing volcanic vitreous sediment powder with $Al_2O_3$ powder and $Li_2O$ powder, heating to melt the mixture, thereafter performing a treatment for removing strain, reheating the performed one at a temperature in a specific range for 12–24 hours, and then slowly cooling it. According to the method of the reference, the maximum negative coefficient of thermal expansion of the material obtained by the technique is about $-60 \times 10^{-7}/°$ C.

However, the glass ceramic comprises volcanic vitreous sediments as a raw material and it is not possible to adjust the content of each component, i.e., an alkali metal oxide, an alkaline-earth metal oxide, a transition metal oxide and the like which is necessary to deposit the main crystal phase, other than $SiO_2$ or $Li_2O$. Accordingly, it is not possible to avoid fluctuations of composition thereof and it is difficult to deposit a desired amount of a desired crystal phase. Therefore, the method disclosed in the reference cannot produce a crystallized glass stable in respect of physical properties and quality.

Further, the production method has problems of comprising complex steps, as described in the embodiment of the publication, that is, melting the mixed powder to make cullet, crushing the cullet, and melting it again at a temperature of 1600° C., and of higher production costs and unstable productivity because the melting temperature of the glass is very high.

Japanese Patent Application No. Tokugan-hei 11-290029 describes a glass ceramic comprising β-eucryptite solid solution, β-quartz solid solution or the like. The application says that a coefficient of thermal expansion of $-25 \times 10^{-7}/°$ C. to $-100 \times 10^{-7}/°$ C. can be obtained in a temperature range of $-40°$ C. to $+160°$ C., and the glass ceramic can be used for various types of temperature compensating members.

However, in fact, the glass ceramic has a large hysteresis of the coefficient of thermal expansion and therefore it is difficult to use it as a temperature compensating member.

Japanese Patent Application Publication (Laid-open) No. Tokukai-hei 2-208256 discloses a $ZnO$—$Al_2O_3$—$SiO_2$ system glass ceramic having a low thermal expansion property, which comprises a main crystal phase of β-quartz solid solution and/or a zinc petalite solid solution. However, the ceramic has the minimum coefficient of thermal expansion having about $-2.15 \times 10^{-6}/°$ C. ($-21.5 \times 10^{-7}/°$ C.) which is not enough.

Because the ceramic contains a large quantity of ZnO component which is apt to sublimate at a high temperature, it is not preferable that a raw material is molten for a long time during formation of parent glass (original glass), as described in this reference. The melting time disclosed in the embodiment is extremely short, i.e., only ten minutes. According to such a short time for melting the material, the components of $SiO_2$ and $Al_2O_3$ are not molten sufficiently. As a result, a part thereof is leave to be unmolten even if the melting temperature is high. Accordingly, it is not possible to obtain a parent glass with even quality. As a result, it is not possible to obtain a uniform ceramic even if crystallizing such a parent glass with uneven quality.

If the glass is molten for a long time, e.g., in general, for several hours, the problem of leaving a part thereof unmolten can be solved. However, in this case, because the composition of the parent glass is changed by sublimation of ZnO component, it is also not possible to obtain a uniform ceramic.

Because the melting temperature in the above-described embodiment is very high, i.e., 1620° C., higher production costs are required.

U.S. Pat. No. 5,694,503 discloses a package comprising an optical fiber with a refractive index grating, and a support member having a negative coefficient of thermal expansion, to which the optical fiber is attached. As a negative thermal expansion material, a Zr-tungstate-based composition or an Hf-tungstate-based composition is used. In the method, a material having a negative coefficient of thermal expansion of $-9.4 \times 10^{-6}/°$ C. is obtained by using $ZrW_2O_8$ having a coefficient of thermal expansion of $-4.7 \times 10^{-6}/°$ C. to $-9.4 \times 10^{-6}/°$ C. The reference says that it is possible to reduce the wavelength shift caused by temperature change by attaching the optical fiber on the support member made of the negative thermal expansion material, with applying an appropriate stress to the grating.

In the material of $ZrW_2O_8$ or $HfW_2O_8$, complicated steps, that is, adding an appropriate amount of material powder having a positive coefficient of thermal expansion, e.g., $Al_2O_3$, $SiO_2$, $ZrO_2$, MgO, CaO, or $Y_2O_3$, to the negative thermal expansion material, to adjust the coefficient of thermal expansion to a desired value, and sintering the mixture to make a sintered body, are required. Therefore, such a material is not suited for mass production. Because different materials must be mixed, suitable technology and facilities are required. The materials do not necessarily have uniform quality. Further, because in $ZrW_2O_8$ or $HfW_2O_8$, a phase transition occurs at a temperature around 157° C. and a flexuous portion is seen in a thermal expansion curve, it is not thermally stable in a wide temperature range.

Each of the publication WO97/14983 and Japanese Patent Application Publication (Laid-open) No. Tokukai-hei 10-90555 discloses a liquid crystal polymer, as a material having a negative coefficient of thermal expansion.

However, because the liquid crystal polymer is a crystalline resin and has a strong crystal orientation characteristic, for example, in an injection molded product, there is a problem of curvature and the like. There is another problem that the one having a large negative coefficient of thermal expansion, e.g., $-100 \times 10^{-7}/°$ C., in the direction of orientation, has a large positive coefficient of thermal expansion in directions other than the orientation direction. Because the value of the material property, e.g., bending strength, elastic modulus or the like, also differs depending on the direction, it is difficult to use such a material for a device.

As described above, in the actual circumstances, conventional materials having a negative coefficient of thermal expansion are used little in various fields, e.g., optical communication field, energy related field, information related field, and the like because of having the above problems.

SUMMARY OF THE INVENTION

The present invention was developed in view of the problems in the actual circumstances. An object of the invention is to provide a glass ceramic which has a sufficiently large absolute value of negative coefficient of thermal expansion in a temperature range of −40° C. to +160° C. which is a general temperature range in use in optical communication field, energy related field, information related field, and the like, and which can be produced at a low cost and stably on the points of composition and property, and to provide a temperature compensating member using the glass ceramic.

The inventor has carried on various examinations and researches to attain the above-described object. As a result, the inventor has succeeded in obtaining glass ceramics which improve stability of material, restrain generation of microcracks and have no anisotropic expansion, by heat-treating $Li_2O$—$Al_2O_3$—$SiO_2$—$TiO_2$ system glasses within the range of the specific compositions to deposit fine crystal grains, and has found that the obtained glass ceramics are preferable as temperature compensating material. The present invention has been achieved on the basis of the facts.

That is, in accordance with an aspect of the present invention, a glass ceramic comprises: a main crystal phase which comprises at least one selected from a group consisting of β-eucryptite (β-$Li_2O.Al_2O_3.2SiO_2$), β-eucryptite solid solution (β-$Li_2O.Al_2O_3.2SiO_2$ solid solution), β-quartz (β-$SiO_2$), and β-quartz solid solution (β-$SiO_2$ solid solution), wherein an average grain size of the main crystal phase is less than 5 μm, and a coefficient of thermal expansion thereof is −30×$10^{-7}$ to −90×$10^{-7}$/° C. in a temperature range of −40° C. to +160° C., and a hysteresis of the coefficient of thermal expansion is not more than 20 ppm (×$10^{-6}$), The main crystal phase may contain no $Al_2TiO_5$ crystal.

The glass ceramic may be substantially free of PbO, $Na_2O$ and $K_2O$.

The glass ceramic may comprise the following components:

| | Mass % |
|---|---|
| $SiO_2$ | 40–65 |
| $Al_2O_3$ | 25–42 |
| $Li_2O$ | 7–13 |
| $B_2O$ | 0–3 |
| BaO | 0–3 |
| SrO | 0–3 |
| BaO + SrO | 0.5–5.0 |
| MgO | 0–2 |
| CaO | 0–2 |
| ZnO | 0–6 |
| $P_2O_5$ | 0–4 |
| $ZrO_2$ | 0–2 |
| $TiO_2$ | 0.5–3.0 |
| $TiO_2 + ZrO_2$ | 0.5–4.5 |
| $As_2O_3 + Sb_2O_3$ | 0–2. |

The glass ceramic may be produced by a method comprising the steps of: melting an original glass, forming the molten original glass and slowly cooling the formed glass, carrying out a first heat treatment for the cooled product at a temperature of 550 to 800° C. for 0.5 to 50 hours; and carrying out a second heat treatment for the heat-treated product at a temperature of 700 to 950° C. for 0.5 to 30 hours.

The glass ceramic may be produced by a method comprising the steps of: cutting and polishing the glass ceramic, and thereafter carrying out a heat treatment for the cut and polished glass ceramic at a temperature of 200 to 400° C. for 1 to 10 hours.

A temperature compensating member comprises the glass ceramic comprising: a main crystal phase which comprises at least one selected from a group consisting of β-eucryptite (β-$Li_2O.Al_2O_3.2SiO_2$), β-eucryptite solid solution (β-$Li_2O.Al_2O_3.2SiO_2$ solid solution), β-quartz (β-$SiO_2$), and β-quartz solid solution (β-$SiO_2$ solid solution), wherein an average grain size of the main crystal phase is less than 5 μm, and a coefficient of thermal expansion thereof is −30× $10^{-7}$ to −90×$10^{-7}$/° C. in a temperature range of −40° C. to +160° C., and a hysteresis of the coefficient of thermal expansion is not more than 20 ppm.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Figure 1:
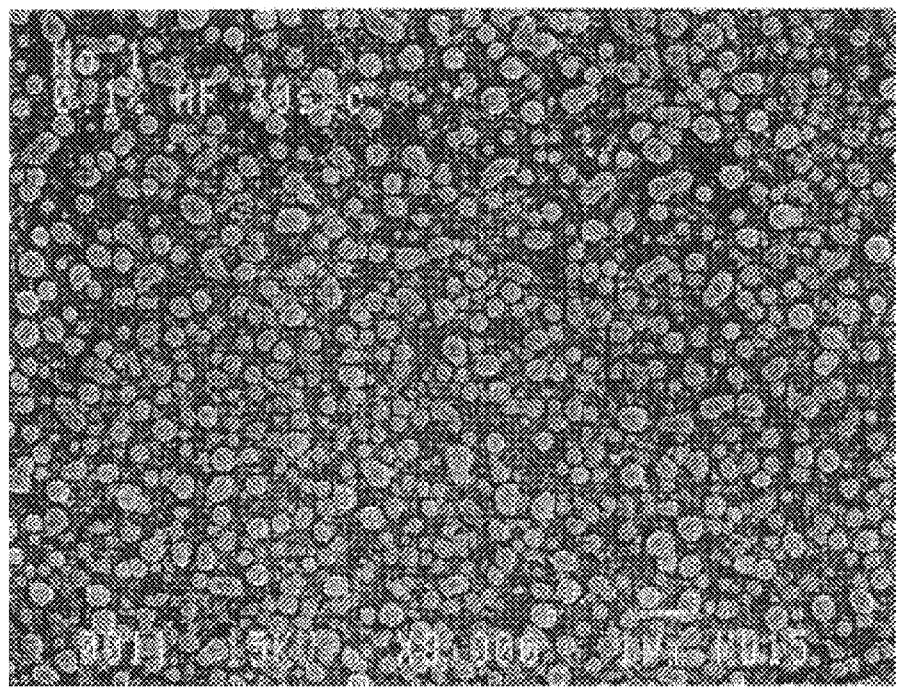
FIG. 1 shows a SEM photograph of a surface of the glass ceramic according to the Example No. 1, after the surface of the glass ceramic was mirror-polished and was etched.

The glass ceramics having a negative coefficient of thermal expansion according to the present invention will be explained in detail, as follows.

In this invention, the term "glass ceramic" means a material obtained by heat-treating a glass to deposit a crystal phase in a glass phase. This term includes not only a material consisting essentially of a glass phase and a crystal phase but also a material in which the whole glass phase therein has been changed to a crystal phase, i.e., the material in which an amount of crystal is 100 mass %, that is, the material having a crystallinity of 100 mass %. In the specification, the ratio of each component of compositions is indicated in mass %.

In the specification, the term "main crystal phase" includes all of crystal phases having a relatively large deposition ratio. That is, in an X-ray diffraction chart (the axis of ordinate representing intensities of the X-ray diffraction, and the axis of abscissa representing angles of diffraction) of the X-ray diffraction, when an intensity of a main peak (the most highest peak) of a crystal phase which is deposited at the highest deposition ratio, is 100, the main crystal phase represents a phase having a ratio of an intensity of a main peak of each deposited crystal phase (the highest peak in each crystal phase) in an X-ray diffraction (hereinafter, the ratio being referred to as X-ray intensity ratio), which is not less than 30. An X-ray intensity ratio of a crystal except the main crystal phase is preferably less than 20, more preferably less than 10, and the most preferably less than 5.

The main crystal phase of the negative thermal expansion glass ceramic according to the present invention comprises at least one or more selected from the group consisting of β-eucryptite (β-$Li_2O.Al_2O_3.2SiO_2$), β-eucryptite solid solution (β-$Li_2O.Al_2O_3.2SiO_2$ solid solution), β-quartz (β-$SiO_2$) and β-quartz solid solution (β-$SiO_2$ solid solution). In the specification, the term "solid solution" represents a crystal phase in which an element except the element constituting the crystal in the crystal phase is substituted for a part of β-eucryptite or that of β-quartz, or in which an atom is doped into the crystal in the β-eucryptite or in the β-quartz.

These main crystal phases are an important element for contributing to a coefficient of thermal expansion of the negative thermal expansion glass ceramic according to the present invention. By heating an original glass having a specific composition at a predetermined condition, the above-described main crystal phase having a negative coefficient of thermal expansion is deposited in a glass phase having a positive coefficient of thermal expansion, or all of the glass phases are phase-transited into a crystal phase including the above-described main crystal phase. Therefore, it is possible that the coefficient of thermal expansion of entire glass ceramic is controlled within the desired negative value range.

The type of main crystal phase and the crystallinity of entire glass ceramic are determined by the contents of $LiO_2$, $Al_2O_3$ and $SiO_2$ within the range of the specific compositions and by all of the heat treatment temperatures in the crystallization which will be described below. The range of the crystallinity is preferably 70 to 99 mass % and more preferably 70 to 95 mass %.

The term "average crystal grain size" represents an average value of the sizes of the crystal grains constructing a polycrystal. The average crystal grain size is measured by the SEM observation. When the average crystal grain size is large, the surface of the polycrystal becomes rough. Further, it is difficult to obtain a fine material. It is easy to cause microcracks. Therefore, the grain size (on average) is preferably less than 5 $\mu$m, more preferably less than 3 $\mu$m, and the most preferably less than 2 $\mu$m.

In the specification, the term "coefficient of thermal expansion" represents an average liner thermal expansion. In order to use the glass ceramic as a temperature compensating member for various types of device, the coefficient of thermal expansion of the glass ceramic is $-30 \times 10^{-7}$ to $-90 \times 10^{-7}/°$ C. In order to use the glass ceramic for a device relating to an optical communication, the coefficient of thermal expansion of the glass ceramic is preferably $-40 \times 10^{-7}$ to $-85 \times 10^{-7}/°$ C. In particular, the coefficient of thermal expansion of the glass ceramic used for a temperature compensating member of a fiber grating device is the most preferably $-50 \times 10^{-7}$ to $-85 \times 10^{-7}/°$ C.

The term "hysteresis" of the coefficient of thermal expansion represents the difference in $\Delta L/L$ value at the temperature at which the $\Delta/L$ curve in the heating process is the most apart from the $\Delta/L$ curve in the cooling process (that is, the maximal value of the difference in the coefficient of thermal expansion between the heating process and the cooling process), when the coefficient of thermal expansion is measured from a low temperature to a high temperature and then from a high temperature to a low temperature in order to draw the $\Delta/L$ curves. In case that the glass ceramic is used as various types of temperature compensating member, when the coefficient of thermal expansion in the heating process is much different from that in the cooling process, that is, when the shape of the material is changed in the heating and cooling process, the temperature compensation cannot be carried out. As a result of studying the hysteresis of the coefficient of thermal expansion in many ways, it is found that the glass ceramic can be adapted to the temperature compensating member by adjusting the hysteresis of the coefficient of thermal expansion thereof to not less than 20 ppm. The hysteresis of the coefficient of thermal expansion thereof is preferably not less than 18 ppm, more preferably not less than 15 ppm and the most preferably not less than 13 ppm.

The components $SiO_2$, $Li_2O$ and $Al_2O_3$ are important ones constituting the main crystal phases β-eucryptite, β-eucryptite solid solution, β-quartz and β-quartz solid solution.

The component $SiO_2$ is the main component of the above main crystal phase having a negative coefficient of thermal expansion. When the $SiO_2$ content is less than 40%, it is hard to deposit the desired main crystal phase sufficiently. When the $SiO_2$ content is more than 65%, it is hard to melt and refine the glass. Further, the crystal phase except the desired main crystal phase is deposited. Therefore, the $SiO_2$ content is preferably from 40% to 65%, more preferably from 42% to 60% and the most preferably from 45% to 55%.

When the $Al_2O_3$ content is less than 25%, the uniformity of an original glass deteriorates because it is hard to melt the glass. Further, it is hard to deposit the desired main crystal phase in a necessary amount. On the other hand, when the $Al_2O_3$ content is more than 42%, the melting point of the glass is too high. Further, it is hard to melt and refine the glass. Therefore, the $Al_2O_3$ content is preferably from 25% to 42%, more preferably from 26% to 40% and the most preferably from 27% to 37%.

When the $Li_2O$ content is less than 7%, it is hard to obtain the desired main crystal phase in a necessary amount. When the $Li_2O$ content is more than 13%, it is hard to vitrify the glass ceramic. Further, the strength of the glass ceramic becomes low after the heat treatment. Therefore, the $Li_2O$ content is preferably from 7% to 13%, more preferably from 8% to 12% and the most preferably from 9% to 12%.

Although the component $B_2O_3$ can be voluntarily added to a raw material of the glass in order to improve the meltability of the original glass or the like, the component $B_2O_3$ is one constituting a glass phase of the negative thermal expansion glass ceramic according to the present invention. When the $B_2O_3$ content is more than 3%, it is obstructed that the desired main crystal phase is deposited. Further, the coefficient of thermal expansion of the glass ceramic exceeds a target value.

Each component BaO, SrO, MgO, ZnO and CaO is important one constituting β-eucryptite solid solution (β-$Li_2O.Al_2O_3.2SiO_2$ solid solution) and 5-quartz solid solution (β-$SiO_2$ solid solution). When these contents exceed 3%, 3%, 2%, 6% and 2% respectively, the coefficient of thermal expansion of the glass ceramic becomes large. Therefore, it is hard to obtain the coefficient of thermal expansion of the glass ceramic as a target value.

In these components, the component BaO prevents platinum of a crucible and another metal element in an original glass from alloying during the melt of the original glass by adding not less than 0.5% BaO to a raw material of the glass. Further, the component BaO can keep that the original glass is resistant to devitrification. The BaO content is preferably not less than 0.5%, more preferably from 0.5% to 2.5% and the most preferably from 1.0% to 2.0%, if possible.

The component SrO can keep that the original glass is resistant to devitrification by adding not less than 0.5% SrO to a raw material of the glass. Further, the component SrO can reduce the hysteresis of the coefficient of thermal expansion of the glass ceramic by mixing SrO with the other components RO (metal oxide). The SrO content is preferably not less than 0.5%, more preferably from 0.5% to 2.5% and the most preferably from 1.0% to 2.0%. In order to keep that the original glass is resistant to devitrification as described above, it is desirable that the sum of the BaO content and the SrO content is 0.5% to 5% and more preferably from 1.0% to 3.5%.

The component MgO can improve the meltability of the original glass and the refinement thereof. However, the component MgO causes the coefficient of thermal expansion of glass ceramic to be large. When the MgO content exceeds 2%, a sufficient negative coefficient of thermal expansion cannot be obtained. Further, the hysteresis of the coefficient of thermal expansion of the glass ceramic increases. The stability of the glass becomes poor. It is desirable that the MgO content is preferably not more than 2%, more preferably not more than 1%.

The component ZnO can improve the meltability of the original glass and the refinement thereof. Further, the component ZnO causes the coefficient of thermal expansion of glass ceramics to be minus. However, when the ZnO content exceeds 6%, the stability of the glass becomes poor. It is desirable that the ZnO content does not exceed 6%, and is more preferably from 0.5% to 5%.

The component CaO can improve the meltability of the original glass and the refinement thereof. However, when the CaO content exceeds 2%, a sufficient negative coefficient of thermal expansion cannot be obtained. The CaO content is preferably not more than 2%, and more preferably not more than 1.5%.

Each component $P_2O_5$, $ZrO_2$ and $TiO_2$ acts as a nucleation agent. However, when these contents exceed 4%, 2% and 3% respectively, it is hard to melt and refine the original glass. As a result, an unmolten material remains in the glass ceramic. The range of the $ZrO_2$ content is preferably 0.0 to 2.0% and the most preferably 1.0% to 1.5%. The range of the $TiO_2$ content is preferably 0.5% to 3.0%, and the most preferably 1.0% to 2.5%. When the sum of the $TiO_2$ content and the $ZrO_2$ content exceeds 4.5%, it is hard to obtain a desired coefficient of thermal expansion of the glass ceramic. It is desirable that the sum thereof is not more than 4.5%.

The components $As_2O_3$ and $Sb_2O_3$ can be added to a raw material of the glass as a refining agent in order to obtain a uniform product when the original glass is molten. The sufficient total amount of these components to be added is not more than 2%.

As components except the above-described components, to the extent of non-deterioration of the desired properties of the glass ceramic according to the present invention, each component $F_2$, $La_2O_3$, $Ta_2O_5$, $GeO_2$, $Bi_2O_3$, $WO_3$, $Y_2O_3$, $Gd_2O_3$, $SnO_2$, $CoO$, $NiO$, $MnO_2$, $Fe_2O_3$, $Cr_2O_3$, $Nb_2O_5$, $V_2O_5$, $Yb_2O_3$, $CeO_2$, $Cs_2O$ or the like can be added to a raw material of the glass when each content is not more than 3%.

The component PbO is not suitable for an environment. The components $Na_2O$ and $K_2O$ change the properties of the negative thermal expansion glass ceramic according to the present invention by diffusing the ions thereof in the following treatment, such as a film forming treatment, a rinsing treatment or the like. It is desirable that the glass ceramic is substantially free of the components PbO, $Na_2O$ and $K_2O$.

The glass ceramic according to the present invention, which comprises the above-described composition i s produced by the following process.

Each material of the glass, such as oxide, carbonate, hydroxide, nitrate, or the like is weighed and compounded so that the glass ceramic has the above-described composition. These materials are placed in a crucible or the like and are molten at a temperature of about 1300 to 1500° C., for about 6 to 8 hours while stirring these materials. As a result, an original glass is obtained in a refined state. Then, the crystallization of the glass ceramic is carried out by the following process.

As described above, after the original glass was molten, the molten glass is cast into a die or the like to mold and slowly cool the glass.

Next, the heat treatment is carried out. The temperature of the molten glass maintains at a temperature of 550 to 800° C. to promote the nucleation (first heat treatment). When the nucleation temperature is lower than 550° C. or is higher than 800° C., it is hard to form desired crystalline nuclei. The nucleation temperature is more preferably from 580 to 750° C., and the most preferably from 600 to 700° C.

It is desirable that the heat treatment time is set in the range of 0.5 to 50 hours in order to obtain the desired property of the glass ceramic. Further, the heat treatment time is more preferably from 1 to 30 hours in consideration of the preferable property thereof, the productivity thereof and the cost thereof.

After the nucleation, the crystallization of the glass is carried out at a temperature of 700 to 950° C. (second heat treatment). When the crystallization temperature is lower than 700° C., it is hard to grow a sufficient amount of the main crystal phase. When the crystallization temperature is higher than 950° C., the original glass is softened and deformed, or the original glass is easily re-molten. Therefore, it is not desirable that the crystallization temperature is lower than 700° C. or is higher than 950° C. The crystallization temperature is preferably from 700 to 900° C., and more preferably from 710 to 800° C. After the crystallization, the glass is slowly cooled at a rate of not more than 50° C./hour, more preferably not more than 25° C./hour.

It is desirable that the heat treatment time is set in the range of 0.5 to 30 hours. From the same reasons as the first heat treatment, it is more desirable that the heat treatment time is from 1 to 20 hours.

Further, in case that the glass ceramic obtained by the crystallization is cut and polished in a necessary shape, after the cutting and polishing process, the heat treatment is carried out at a temperature of 200 to 400° C. In this heat treatment, it is possible to release a residual strain caused by the cutting and polishing process and to remove an agent. The coefficient of thermal expansion of the glass ceramic can be stabilized. Further, it is possible to prevent the material from being deteriorated by a residual agent. The heat treatment temperature is more preferably from 200 to 300° C., the most preferably from 250 to 300° C. The retention time for which the temperature is retained, is preferably from 1 to 10 hours, more preferably from 2 to 4 hours. After the temperature was retained, it is desirable that the glass is slowly cooled at a cooling rate of not more than 150° C./hour, more preferably not more than 50° C./hour and the most preferably not more than 10° C./hour.

With respect to this heat treatment time, because the glass has been already cutting and polished, each size of the bulks is not large. Therefore, it is possible to achieve the desired goal by setting the heat treatment time in the range of 1 to 10 hours. When the heat treatment time is not less than 1 hour, it is possible that the grass is stabilized and has a uniform quality. Although the heat treatment can be carried out for over 10 hours, the heat treatment time is not effective in consideration of the cost of the glass and the productivity thereof. When a minute product is produced, there are a few cases in which the effect can be obtained even though the heat treatment time is less than 1 hour.

EXAMPLES

Next, examples of the negative thermal expansion glass ceramic according to the present invention will be explained. The present invention is not limited to these examples.

In Tables 1 and 2, with respect to Examples No. 1 to No. 6 of the glass ceramic according to the present invention, compositions, nucleation temperatures, crystallization temperatures, heat treatment temperatures after cutting and polishing the glass, each retention time at the above temperatures and the like are shown.

The glass ceramics according to the Examples 1 to 6 were produced as follows.

Each material of the glass, such as oxide, carbonate, hydroxide, nitrate, or the like was weighed and compounded so that each glass ceramic had the composition shown in Tables 1 and 2. These materials were placed in a platinum crucible. These materials were molten at the melting temperature shown in Tables 1 and 2, for about 6 to 8 hours by using a normal melting device while stirring these materials.

Next, the molten original glass was cast into a die to mold the glass. Then, the original glass was slowly cooled. Each glass molded body was obtained.

The glass molded bodies were set in a sintering furnace without crashing the molded bodies in the as-molded state. The glass molded bodies were heated to increase the temperature to the nucleation temperatures shown in Tables 1 and 2. The crystalline nuclei were formed by retaining the nucleation temperatures for each predetermined time. Subsequently, the glass molded bodies were heated to increase the temperature to the crystallization temperatures shown in Tables 1 and 2. The glasses were crystallized by retaining the crystallization temperatures for each predetermined time. Then, the glass ceramics were obtained by slowly cooling them at a rate of not more than 50° C./hour.

The glass ceramics were processed, for example, was cutting, was polished or the like, so as to have a desired shape. After the process, the glass ceramics were heated at a rate of about 150° C./hour and were retained in the range of 200 to 400° C. for 3 hours. Then, the glass ceramics were cooled at a cooling rate of 50° C./hour, preferably, about 5 to 10° C./hour.

Each sample having a diameter of 5 mm and a length of 20 mm was cut from the glass ceramics according to each example, which were obtained by the above-described method. Each coefficient of thermal expansion of the samples was measured in the temperature range of −40° C. to +160° C. by the TAS200 Thermo-Mechanical Analyzer manufactured by Rigaku Corporation. Each hysteresis of the coefficient of thermal expansion of the glass ceramic was found from the coefficient of thermal expansion curve.

These results are shown in Tables 1 and 2.

Examples of glass ceramics according to an earlier development are shown as comparative examples No. 1 to No. 6 in Tables 3 and 4 like Tables 1 and 2.

The comparative example 1 is data relating to "88KJX" disclosed in the PCT Japanese national stage application publication (No. Tokuhyo 2000-503967) claiming priority of the U.S. provisional application No.60/010,058 (the U.S. Pat. No. 6,087,280). The comparative example 2 is data relating to the Example 12 disclosed in the U.S. Pat. No. 4,507,392. The comparative examples 3 and 4 are data relating the batch numbers 88MOS (comparative example 3) and 88MOT (comparative example 4) shown in "Table I, #1" which were experimental results described in Affidavit under 37 CFR section 1.132, which was filed with the Remarks in response to Final Action before the issuance of the U.S. Pat. No. 6,087,280. The comparative example 5 is data relating to Example 1 disclosed in the PCT Japanese national stage application publication (No. Tokuhyo 2000-503415) claiming priority of the U.S. provisional application No. 60/010,058. The comparative example 6 is experimental data disclosed in Japanese patent application publication No. Tokugan-Hei 11-290029.

TABLE 1

| | EXAMPLES | | |
|---|---|---|---|
| | 1 | 2 | 3 |
| $SiO_2$ | 47.4 | 45.0 | 48.1 |
| $Al_2O_3$ | 34.6 | 36.9 | 34.7 |
| $Li_2O$ | 11.0 | 11.6 | 11.2 |
| BaO | 1.5 | 1.5 | 2.0 |
| SrO | 1.5 | 1.0 | 1.0 |
| MgO | — | 0.5 | — |
| ZnO | 0.5 | 1.0 | — |
| $ZrO_2$ | 1.5 | 1.0 | 1.5 |
| $TiO_2$ | 1.5 | 1.0 | 1.0 |
| $Sb_2O_3$ | 0.5 | 0.5 | 0.5 |
| Melting temperature (° C.) | 1470 | 1450 | 1450 |
| Nucleation temperature (° C.) | 610 | 640 | 615 |
| Retention time (hr) | 5 | 5 | 5 |
| Crystallization temperature (° C.) | 720 | 720 | 710 |
| Retention time (hr) | 5 | 5 | 5 |
| Heat treatment temperature (° C.) | 250 | 300 | 280 |
| Retention time (hr) | 3 | 2 | 3 |
| Coefficient of thermal expansion ($\times 10^{-7}$/° C.) (−40° C. to +160° C.) | −79 | −74 | −86 |
| Hysteresis (ppm) | 13 | 18 | 13 |
| Crystal grain size ($\mu$m) | 0.8 | 1.5 | 1.2 |

TABLE 2

| | EXAMPLES | | |
|---|---|---|---|
| | 4 | 5 | 6 |
| $SiO_2$ | 47.4 | 45.4 | 47.5 |
| $Al_2O_3$ | 34.6 | 34.6 | 33.5 |
| $Li_2O$ | 11.0 | 11.0 | 10 |
| $B_2O_3$ | — | 2.0 | — |
| BaO | 1.8 | 1.5 | 1.5 |
| SrO | — | 1.5 | 1.5 |
| CaO | — | — | 0.5 |
| ZnO | 1.7 | 0.5 | — |
| $P_2O_5$ | — | — | 2.0 |
| $ZrO_2$ | 1.5 | 1.5 | 1.0 |
| $TiO_2$ | 1.5 | 1.5 | 2.0 |
| $Sb_2O_3$ | 0.5 | 0.5 | 0.5 |
| Melting temperature (° C.) | 1470 | 1420 | 1430 |
| Nucleation temperature (° C.) | 620 | 610 | 580 |
| Retention time (hr) | 5 | 5 | 5 |
| Crystallization temperature (° C.) | 720 | 780 | 720 |
| Retention time (hr) | 5 | 5 | 5 |
| Heat treatment temperature (° C.) | 350 | 300 | 250 |
| Retention time (hr) | 2 | 2 | 3 |
| Coefficient of thermal expansion ($\times 10^{-7}$/° C.) (−40° C. to +160° C.) | −79 | −64 | −71 |
| Hysteresis (ppm) | 15 | 13 | 20 |
| Crystal grain size ($\mu$m) | 1.5 | 0.8 | 0.8 |

TABLE 3

| | COMPATATIVE EXAMPLES | | |
|---|---|---|---|
| | 1 | 2 | 3 |
| $SiO_2$ | 48.0 | 61.4 | 50.9 |
| $Al_2O_3$ | 38.1 | 26.1 | 34.6 |
| $Li_2O$ | 9.6 | 5.3 | 10.1 |
| $B_2O_3$ | — | — | — |
| BaO | — | — | — |
| CaO | — | — | — |
| ZnO | — | 1.6 | — |
| $ZrO_2$ | — | — | — |
| $TiO_2$ | 4.3 | 4.7 | 4.4 |
| $WO_3$ | — | 0.5 | — |
| $As_2O_3$ | — | 0.4 | — |
| $Sb_2O_3$ | — | — | — |
| Melting temperature (° C.) | 1600 | 1600 | 1650 |
| Nucleation temperature (° C.) | 765 | — | — |
| Retention time (hr) | 2 | — | — |
| Crystallization temperature (° C.) | 1300 | 850 | 800 |
| Retention time (hr) | 4 | 0.5 | 1 min. |
| Coefficient of thermal expansion ($\times 10^{-7}$/° C.) (25° C. to 150° C.) | −50 | −29 | −10 |
| Hysteresis (ppm) (Is hysteresis not more than 20 ppm ?) | Yes | — | — |
| Crystal grain size (μm) | 7–10 | — | — |

TABLE 4

| | COMPATATIVE EXAMPLES | | |
|---|---|---|---|
| | 4 | 5 | 6 |
| $SiO_2$ | 50.9 | 50.3 | 47.4 |
| $Al_2O_3$ | 34.6 | 36.7 | 34.6 |
| $Li_2O$ | 10.1 | 9.7 | 11.0 |
| $B_2O_3$ | — | — | — |
| BaO | — | — | 2.0 |
| CaO | — | — | 2.0 |
| ZnO | — | — | — |
| $ZrO_2$ | — | — | 0.5 |
| $TiO_2$ | 4.4 | 3.3 | 2.0 |
| $WO_3$ | — | — | — |
| $As_2O_3$ | — | — | — |
| $Sb_2O_3$ | — | — | 0.5 |
| Melting temperature (° C.) | 1650 | 1600 | 1470 |
| Nucleation temperature (° C.) | — | 765 | 640 |
| Retention time (hr) | — | 2 | 5 |
| Crystallization temperature (° C.) | 1300 | 1300 | 720 |
| Retention time (hr) | 1 min. | 4 | 5 |
| Coefficient of thermal expansion ($\times 10^{-7}$/° C.) (25° C. to 150° C.) | −56 | −78 | −80 |
| Hysteresis (ppm) (Is hysteresis not more than 20 ppm ?) | 40 | — | 48 |
| Crystal grain size (μm) | — | 7–10 | — |

As shown in Tables 1 and 2, the glass ceramics of the Examples according to the present invention have coefficients of thermal expansion in the range of $-64 \times 10^{-7}$ to $-86 \times 10^{-7}$/° C. Each coefficient of thermal expansion has a negative value having a vary large absolute value.

As a result of the X-ray diffraction, the main crystal phases of these glass ceramics were β-eucryptite solid solution(β-$Li_2O.Al_2O_3.2SiO_2$ solid solution), and β-quartz solid solution (β-$SiO_2$ solid solution).

In contrast with the Examples, the comparative example No. 1 is a glass ceramics having $TiO_2$ more than the glass ceramics according to the present invention. The melting temperature and the crystallization temperature of the comparative example No. 1 are high. The crystal grain size of the comparative example No. 1 is large. Therefore, a large number of microcracks exist in the glass ceramic. Some problems about the strength of the glass ceramic and about the surface property thereof after the process are easily caused. The comparative example No. 2 is also a glass ceramic having $TiO_2$ more than the glass ceramics according to the present invention. Although the crystallization temperature of the comparative example No. 2 is high, the desired coefficient of thermal expansion cannot be obtained. The comparative example No. 3 is also a glass ceramic having $TiO_2$ more than the glass ceramics according to the present invention. However, the desired coefficient of thermal expansion cannot be obtained. Because the glass ceramic of the comparative example No.4 has a large hysteresis, it is hard to use the glass ceramic of the comparative example No. 4 as a temperature compensating member. The crystallization temperature of the glass ceramic according to the comparative example No. 5 is high. As a result, the crystal grain size of the comparative example No. 5 is large. The comparative example No. 5 has the same problems as the comparative example No. 1. The glass ceramic of the comparative example No. 6 has a large hysteresis. Therefore, it is hard to use the glass ceramic of the comparative example No. 6 as a temperature compensating member like the comparative example No. 4.

A material formed in a stick-shape having the length of 60 mm, the width of 3mm and the thickness of 3 mm was prepared as a temperature compensating member by cutting the glass ceramic obtained by the Example No. 4. A groove for setting an optical fiber was formed on the upper surface of the stick by using a diamond cutter.

Next, an optical fiber made of quartz and comprising a fiber grating having a length of 10 mm was embedded into the groove. The optical fiber was set so as to position the fiber grating on a center portion of the stick.

An assembly was obtained by combining a cover plate with the upper portion of the optical fiber and that of the fiber grating by using an adhesive so as to cover them with the cover plate. As an adhesive, a known adhesive, such as various types of thermosetting resin, may be used. In this case, a thermosetting epoxy resin was used as an adhesive.

Further, the glass ceramic according to the comparative example No. 1 was produced. Then, the assembly containing the glass ceramic of the comparative example No. 1 was made as described above.

Wavelengths of a light reflected from the fiber grating of each assembly were measured while varying a temperature from −40 to +85° C. Then, two wavelength data obtained by using the optical fiber made of the glass ceramic according to the Example No. 4 and one according to the comparative example No. 1 were compared. As a result, when the glass ceramic according to the comparative example No. 1 was used, a variation of the center wavelength was 0.18 nm in the above temperature range. In case of the assembly using the glass ceramic according to the present invention, a variation of the center wavelength was 0.05 nm. A temperature dependency of a wavelength of a light reflected from the fiber grating was reduced. The wavelength of the reflected light was stabilized in the above temperature range.

Figure 2:
FIG. 2 shows a SEM photograph of the glass ceramic according to the comparative example No. 1.

FIG. 1 shows a SEM photograph (scanning electron microscope photograph) of a surface of the glass ceramic according to the Example No. 1, which was taken after the surface of the glass ceramic was mirror-polished and was etched by 0.1% HF solution (hydrofluoric acid) for 30 seconds. As shown in the photograph, the diameters of the crystals deposited in the glass ceramic are not more than 2 $\mu$m. It is found that the crystal is not anisotropy. Further, FIG. 2 shows a SEM photograph (shown in FIG. 13$b$ of the above-described application publication) of the comparative example No. 1. As shown in the photograph, it is found that the microcracks having the diameter of 7 to 10 $\mu$m exist in the glass ceramic.

As described above, the glass ceramic according to the present invention has a coefficient of thermal expansion having a range of $-30 \times 10^{-7}$ to $-90 \times 10^{-7}/°$ C. in a temperature range of $-40°$ C. to $+160°$ C. by heating an $Li_2O$—$Al_2O_3$—$SiO_2$—$TiO_2$ system glass within the range of the specific compositions and crystallizing the glass. Therefore, in an optical device which is often used in an optical communication field, such as a fiber grating, a connector, a coupler of an optical fiber, an optical waveguide or the like, the glass ceramic can cause the optical device to perform the temperature compensation by combining the glass ceramic with a material having a positive coefficient of thermal expansion.

The glass ceramic has a thermal stability. The glass ceramic is a material which is not anisotropy in various types of property thereof. Further, by depositing fine crystal grains, the microcracks are restrained from being caused. The glass ceramic has an excellent mechanical strength. Therefore, because the glass ceramic is excellently processible, it is possible to use the glass ceramic for a ferrule of a connector or the like.

For example, it is difficult that a fine hole having a diameter ($\phi$) of 0.125 mm is formed in a cylinder having a diameter ($\phi$) of 1.25 mm and a length of 6.5 mm, when the cylinder is processed by a general method. In case of the glass ceramic according to the present invention, it is possible to form the fine hole in the cylinder as follows. The glass ceramic is ground in a semi-cylindrical shape. The surface thereof is mirror-polished. A groove having a depth of about 0.063 mm and having a semi-circular shape or a V-shape is formed on a central portion of the semi-cylinder. Then, the two formed semi-cylinders are combined. As a result, the desired fine hole can be formed. Further, when a taper is formed so that an edged portion of the groove is formed deeply (for example, 0.45 mm) and the groove is gradually shallow toward the central portion of the cylinder, and the edged portion of the fine hole is formed in a trumpet-like shape, the fiber can be smoothly inserted into the fine hole.

The glass ceramic can be used as a temperature compensating member in a bulk form in various fields, such as not only the optical communication field, but also the energy related field, the information communication field, the electronics field or the like.

Further, the glass ceramic according to the present invention can be used as a filler for reducing a thermal expansion, which has an excellent dimensional stability and an excellent thermal stability. The filler reduces a coefficient of thermal expansion of an organic material and/or an inorganic material (for example, adhesive, sealing agent or the like) used in the above described fields or adjusts the coefficient of thermal expansion thereof to a suitable value, by crashing the glass ceramic into particles having a diameter of not more than 100 $\mu$m, preferably not more than 50 $\mu$m with a known crushing device, such as a ball mill, a vibrating mill, a roller mill, a jet mill or the like and by combining the crushed glass ceramic with the organic material and/or the inorganic material.

The organic material and the inorganic material are not limited to a specific material. The materials are, for example, a phenol resin, an epoxy resin, a polyamide resin, a polycarbonate resin, a glass having a low melting point or the like. The material can be used for various matters, such as for general industry, architecture or the like.

The glass ceramic according to the present invention can be produced by melting an original glass at a lower temperature than one according to an earlier development. Further, the temperature of the heat treatment for the crystallization of the glass is low. Therefore, the glass ceramic can be produced at a low cost. Because the glass ceramic contains no unstable components in the composition and the composition ratio of the components can be easily controlled, the glass ceramic can be produced stably in respect of the composition and the properties thereof.

The entire disclosure of Japanese Patent Application No. Tokugan 2000-296684 filed on Sep. 28, 2000 including specification, claims, drawings and summary are incorporated herein by reference in its entirety.

What is claimed is:

1. A glass ceramic comprising a main crystal phase which comprises at least one selected from a group consisting of $\beta$-eucryptite ($\beta$-$Li_2O.Al_2O_3.2SiO_2$), $\beta$-eucryptite solid solution ($\beta$-$Li_2O.Al_2O_3.2SiO_2$ solid solution), $\beta$-quartz ($\beta$-$SiO_2$), and $\beta$-quartz solid solution ($\beta$-$SiO_2$ solid solution), wherein an average grain size of the main crystal phase is less than 5 $\mu$m, and a coefficient of thermal expansion thereof is $-30 \times 10^{-7}$ to $-90 \times 10^{-7}/°$ C. in a temperature range of $-40°$ C. to $+160°$ C., and a hysteresis of the coefficient of thermal expansion is not more than 20 ppm.

2. The glass ceramic as claimed in claim 1, wherein the main crystal phase is substantially free of $Al_2TiO_5$ crystal.

3. The glass ceramic as claimed in claim 1, wherein the glass ceramic is substantially free of PbO, $Na_2O$ and $K_2O$.

4. The glass ceramic as claimed in claim 1, comprising the following components:

|  | Mass % |
| --- | --- |
| $SiO_2$ | 40–65 |
| $Al_2O_3$ | 25–42 |
| $Li_2O$ | 7–13 |
| $B_2O_3$ | 0–3 |
| BaO | 0–3 |
| SrO | 0–3 |
| BaO + SrO | 0.5–5.0 |
| MgO | 0–2 |
| CaO | 0–2 |
| ZnO | 0–6 |
| $P_2O_5$ | 0–4 |
| $ZrO_2$ | 0–2 |
| $TiO_2$ | 0.5–3.0 |
| $TiO_2 + ZrO_2$ | 0.5–4.5 |
| $As_2O_3 + Sb_2O_3$ | 0–2. |

5. The glass ceramic as claimed in claim 1, wherein the glass ceramic is produced by a method comprising the steps of: melting an original glass, forming the molten original glass and slowly cooling the formed glass, carrying out a first heat treatment for the cooled glass at a temperature of 550 to 800° C. for 0.5 to 50 hours; and carrying out a second heat treatment for the first heat-treated glass at a temperature of 700 to 950° C for 0.5 to 30 hours.

6. The glass ceramic as claimed in claim 1, wherein the glass ceramic is produced by a method comprising the steps of: cutting and polishing the glass ceramic, and thereafter carrying out a heat treatment for the cut and polished glass ceramic at a temperature of 200 to 400° C. for 1 to 10 hours.

7. A temperature compensating member comprising the glass ceramic comprising: a main crystal phase which comprises at least one selected from a group consisting of β-eucryptite (β-$Li_2O.Al_2O_3.2SiO_2$), β-eucryptite solid solution (β-$Li_2O.Al_2O_3.2SiO_2$ solid solution), β-quartz (β-$SiO_2$), and β-quartz solid solution (β-$SiO_2$ solid solution), wherein an average grain size of the main crystal phase is less than 5 μm, and a coefficient of thermal expansion thereof is $-30 \times 10^{-7}$ to $-90 \times 10^{-7}$/° C. in a temperature range of −40° C. to +160° C., and a hysteresis of the coefficient of thermal expansion is not more than 20 ppm.

* * * * *